INVENTOR.
NORMAN L. STAUFFER
BY Arthur H. Swanson
ATTORNEY.

Aug. 11, 1964  N. L. STAUFFER  3,144,294
MEASURING APPARATUS
Filed Jan. 31, 1961  3 Sheets-Sheet 2
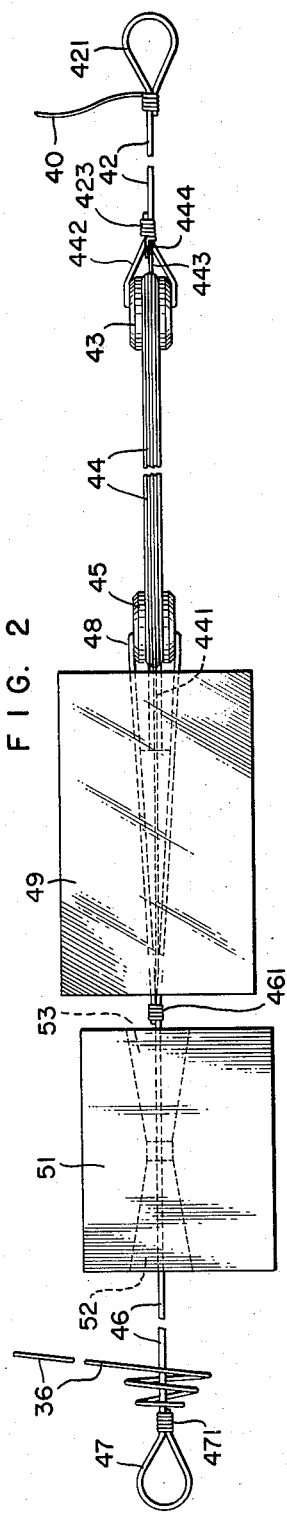
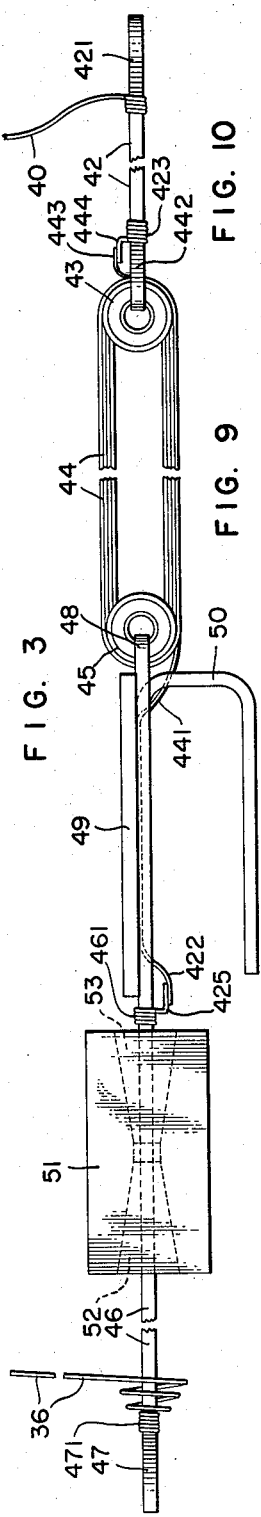
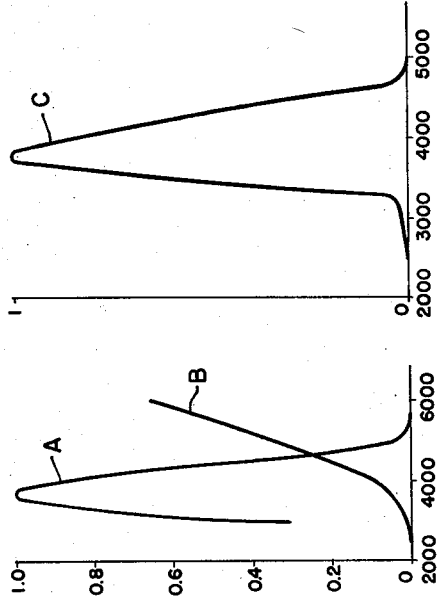
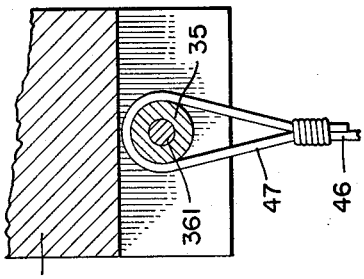
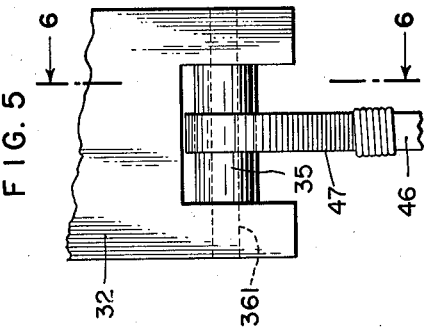
INVENTOR.
NORMAN L. STAUFFER
BY
*Arthur H. Swanson*
ATTORNEY.

Aug. 11, 1964　　　　　N. L. STAUFFER　　　　　3,144,294
MEASURING APPARATUS
Filed Jan. 31, 1961　　　　　　　　　　　　　　3 Sheets-Sheet 3
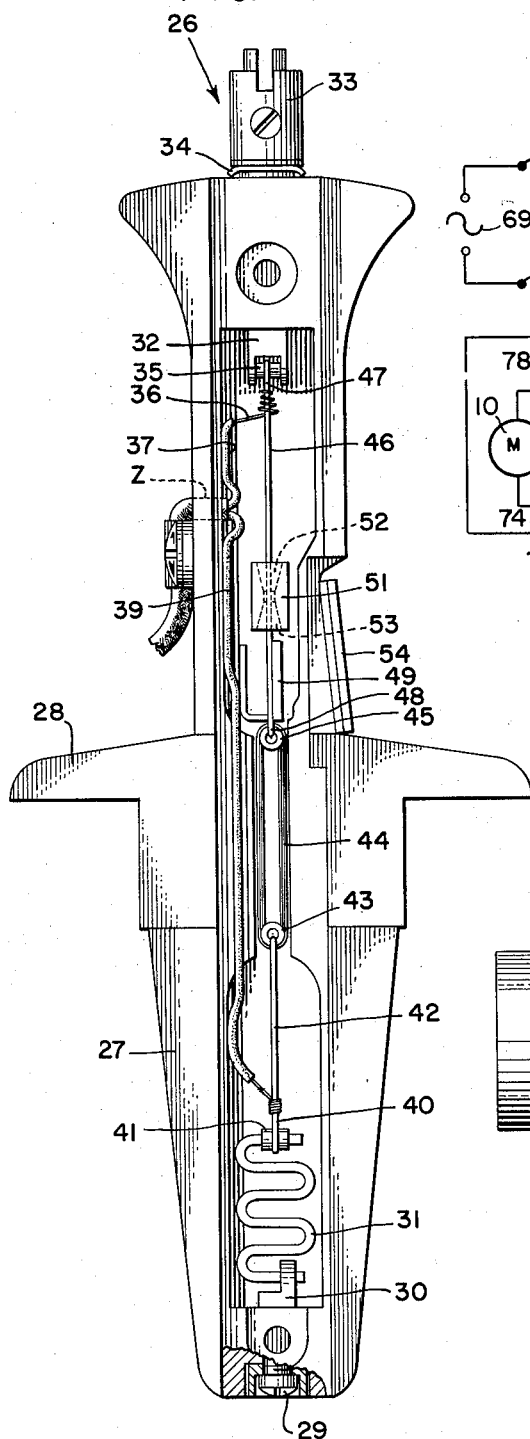
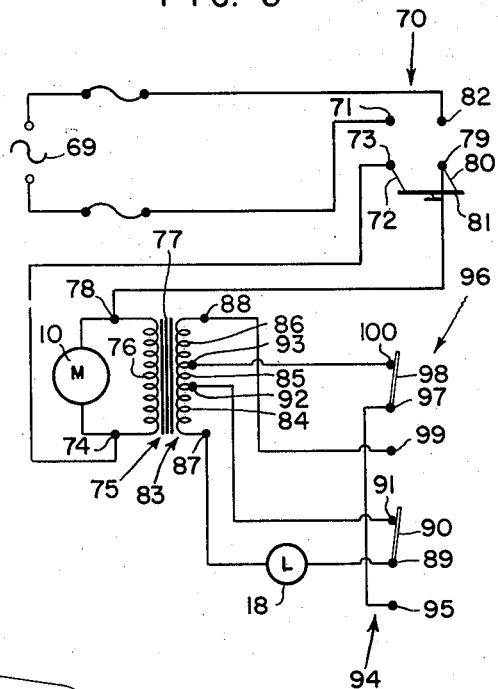
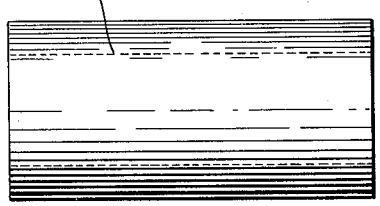
INVENTOR.
NORMAN L. STAUFFER
BY Arthur H. Swanson
ATTORNEY.

United States Patent Office 3,144,294
Patented Aug. 11, 1964

3,144,294
MEASURING APPARATUS
Norman L. Stauffer, Denver, Colo., assignor to Minneapolis-Honeywell Regulator Company, Minneapolis, Minn., a corporation of Delaware
Filed Jan. 31, 1961, Ser. No. 86,219
7 Claims. (Cl. 346—108)

This invention relates to oscillographs which produce immediately visible records by means of beams or pencils of radiant energy such as ultra-violet light.

This invention relates to the type of oscillograph shown in United States Patent 2,580,427 to C. A. Heiland, which discloses an oscillograph in which beams or pencils of ultra-violet or infra-red radiant energy are caused to move over the surface of a recording paper having a maximum response to the wave lengths of the beams of radiant energy employed. In one form, the Heiland patent uses a mercury vapor lamp to provide a source of invisible radiation, such as ultra-violet rays. Such sources are expensive to install and to replace and have a high consumption of electric power which is dissipated in the lamp and power supply as heat, requiring the use of elaborate cooling equipment. Additionally, such sources are characterized in their slowness in starting, particularly when hot, and in their prolonged warm-up time.

It is an object of this invention to produce an oscillograph which produces immediately visible records and in which the source of ultra-violet radiation is low in cost, consumes little power, and may be energized from a commercial source of alternating current electricity directly through a step-down transformer and without rectification. In consequence of this, desired simplification and cost reduction of the power supply and cooling equipment is effected.

More specifically, it is an object of this invention to provide an oscillograph having a source of radiant energy composed of an electric light bulb having a tungsten filament contained within an envelope which readily transmits ultra-violet radiation. Such a source has a normal, expected life many times that of the high pressure mercury vapor lamps used in the prior art. The electric light bulb provided in accordance with this invention emits visible and infra-red radiations as well as ultra-violet radiations. The infra-red radiations contribute not at all to the production of a record trace. The record trace is produced as a result of the response of the recording paper primary to the ultra-violet radiation emitted by the lamp. The visible radiation contributes importantly, as in the aforementioned Heiland patent, in permitting calibration and alignment adjustments and facilitating monitoring of the recording operations.

With such an electric lamp making up the radiation source of the recording beam, less heat is produced than in the prior art oscillograph. Thus smaller and less elaborate cooling equipment may be used. The need for the prior art, expensive power supply equipment also is eliminated because the lamp may be energized from the commercial alternating current source of electric supply directly through a step-down transformer and without rectification. This is permissible because the thermal capacity of the tungsten filament holds the filament at the constant temperature which is needed for the lamp to give continuous, stable radiations suitable for oscillographic recording purposes.

These desirable advantages are obtained while at the same time eliminating the aforementioned undesirable start-up and prolonged warm-up characteristics of high pressure mercury vapor lamps used in the prior art oscillographs to provide the source of recording ultra-violet radiations.

It is a further object of this invention to provide an oscillograph having a novel optical system including a modified cylindrical mirror having a mirror surface shaped as a portion of an ellipse and closely associated with the recording paper for transmitting to and sharply concentrating on the recording paper, uniformly over the full deflection range of the recording beam, a maximum of recording radiations or high energy density in the recording spot.

Cylindrical lenses and mirror surfaces have been provided in prior art oscillograph constructions. Cylindrical lenses, however, are subject to the disadvantage of providing a smaller energy density in the recording spot, or require the use of more than one lens or expensive aspheric or non-spherical lenses to accomplish such a high energy density. The known, prior art, simple, cylindrical mirrors are subject to the disadvantage that large aberrations prevent the high energy densities in the recording spot.

It is a further object of this invention to provide in an oscillograph as described, a galvanometer having pole pieces of sintered iron cast integrally into a case made of aluminum or other non-magnetic casting alloys by investment casting.

A better understanding of the present invention may be had from the following detailed description when read in connection with the accompanying drawings in which:

FIG. 2 is a side elevation of a galvanometer suspension on an enlarged scale.

FIG. 3 is a side elevation of the galvanometer suspension of FIG. 2 viewed at right angles to FIG. 2.

FIG. 4 is a side elevation of a galvanometer showing the pole pieces and the case with parts broken away in vertical cross section.

FIG. 5 is an elevation from the same side as FIG. 4 but on an enlarged scale showing a detail.

FIG. 6 is an elevation at right angles to FIGS. 4 and 5 and on the same scale as FIG. 5.

FIG. 7 is a side elevation of a modification.

FIG. 8 is an electric circuit diagram.

FIGS. 9 and 10 are charts showing the actions of the ultra-violet and closely adjacent radiations and of the sensitizing emulsion of the associated recording paper.

Figure 1:
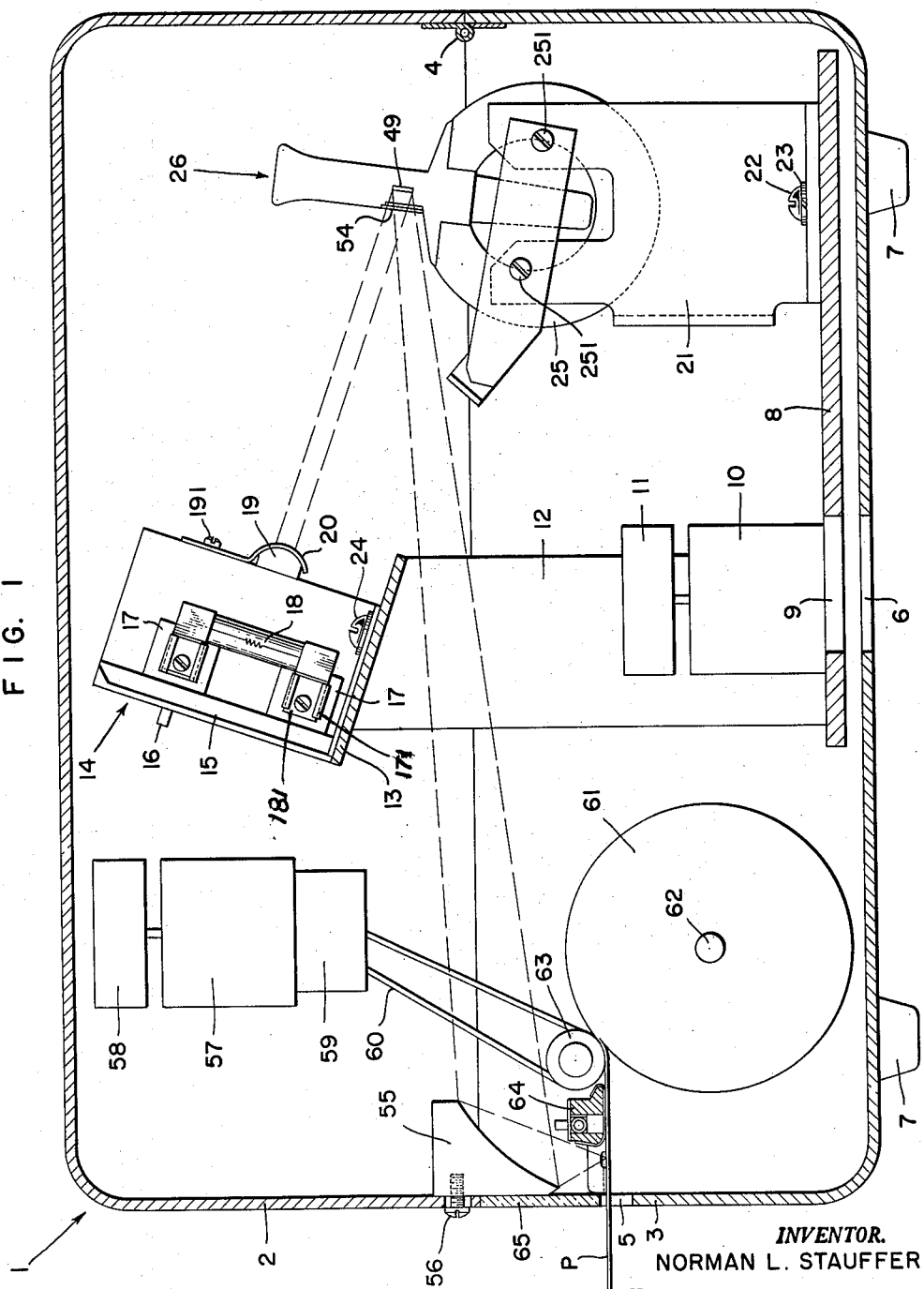
FIG. 1 is a diagram generally in vertical, longitudinal, cross section.

FIG. 1 shows the oscillograph of this invention comprising a case, generally indicated 1, having an upper portion 2 and a lower portion 3 fastened together by hinge 4. Lower portion 3 has a hole 5 in the front or left hand side thereof, as seen in FIG. 1, and a hole 6 in the bottom thereof. Located in case 1 is an assembly containing a lamp housing 14, a cooling fan 11, and a magnet bank complete with galvanometers 26.

This assembly comprises a base plate 8 having an opening 9 in the bottom thereof aligned with an electric motor 10 connected to drive cooling fan 11. The lamp housing mounting bracket comprises two side plates 12 and a cross frame 13. A lamp housing 14 of sheet metal is mounted on cross frame 13 and supports a block of insulation 15 on which are mounted a pair of terminals 16 of which but one is seen in FIG. 1. Metallic spring clips 17 are electrically connected to the two terminals 16.

A source of radiant energy which includes ultra-violet and blue wavelengths of approximately 4700 Angstrom units and shorter wavelengths comprises an electric lamp 18. Lamp 18 operates at from 40 to 70 watts. The filament is of tungsten and the envelope of quartz which transmits ultra-violet light. The lamp is self-cleaning because it operates at a high temperature and contains a trace of iodine gas in the mixture filling the tube. The high outside temperature incinerates most dust particles settling upon the lamp, thus keeping the outside clean. Inside cleaning is accomplished by the iodine vapor, which catches particles of tungsten as they burn off the glowing lamp filament, then redeposits the particles on the filament. In conventional incandescent lamps, the tungsten particles settle on the inside of the bulb creating a black deposit and causing a gradual loss of light output. Since this lamp operates at high temperatures it must be kept free from grease or fingerprints to prevent etching of the envelope. Lamp 18 is mounted in spring clips 17 which conduct current to the lamp by means of a pair of lamp tabs 181 each having a hole in it into which one of the detents 171 fits. The spring clips 17 exert pressure on the tabs 181 to insure good electric contacts therebetween. Poor contact between the spring clips 17 and the tabs 181 will produce arcing which causes a high resistance joint which reduces the intensity of the radiant energy put out by the lamp 18. The lamp housing 14 is ventilated by means of cooling fan 11. This permits the lamp 18 to operate at the correct temperature range at high intensity.

Light from lamp 18 is collected by reducing collector lens 19 which is mounted on lamp housing 14 by a spring clip 20 attached by screws 191. Lens 19 is of quartz. The lens is a crossed positive-negative cylindrical reducing collector lens.

Also mounted on base plate 8 is the magnet and galvanometer bank assembly. This assembly comprises a mounting frame 21 secured to base plate 8 by screws 22 and lockwashers 23, of which but one can be seen in FIG. 1.

By loosening screws 22 and lockwashers 23, the magnet and the galvanometers mounted thereon can be moved forward or backward for focusing of the galvanometer beams. By loosening nuts 251 the magnet assembly may be rotated about a horizontal axis to permit the light beams to be centered on the final mirror 55.

Frame 21 supports the C-shaped magnet 25 having an opening in its upper surface into which extends one or a plurality of galvanometers, generally indicated 26. In one embodiment of this invention six galvanometers are employed.

Since each of these galvanometers is a duplicate of the others a description of one will suffice. These galvanometers may be made to have a natural frequency of forty-two or of three hundred thirty cycles per second (hereinafter abbreviated c.p.s.). Galvanometers having other natural frequencies may be employed, if desired.

FIGS. 2, 3 and 4 show that each of the galvanometers 26 comprises a galvanometer case 27 made of aluminum or other non-magnetic casting metals or alloys by investment casting. Pole pieces 28 are made of sintered iron and cast integrally into case 27. Close tolerances are obtainable by investment castings which eliminates the majority of machining. Also no silver soldering is necessary to join the pole pieces to the cast case.

Case 27 contains, at its lower end, a screw 29 having an L-shaped upper end which forms a stable support 30 for the lower end of the coil and mirror suspension. Support 30 is connected to the lower end of a spring 31 of serpentine S-shape.

At the upper end case 27 contains a mount comprising a shaft 32 having a notch in its lower end and being threaded to receive nut 33. A spring washer 34 loads the shaft nut assembly from free rotation so that when nut 33 is rotated or positioned it will remain in this adjusted position. This entire assembly is attached to the upper suspension by an insulator. In one case, shown in FIGS. 4, 5 and 6, insulator consists of a flanged spool 35 of ivory through which a metal pin 361 passes to hold the insulator into the upper mount 32.

In another version, shown in FIG. 7, a straight glass rod or tube 371 is used which passes thru the upper mount 32 and the upper loop 47 of the suspension. In this version the slot in mount 32 is wider than in the version of FIGS. 5 and 6 to accomplish resistance to voltage breakdown to the case to 1000 volts. The glass rod or tube 371 is a simple part as well as resistant to voltage breakdown.

Case 27 also includes a pair of wire leads 37 and 39 which pass thru the case at point marked "Z." This construction is simple since the continuous wire in the case is also the lead wire of the galvanometer.

FIGS. 2 and 3 show the details of the suspension. A fine coiled wire 36 is connected, at one end, to conductor 37 (FIG. 4) and, at its other end, to the upper loop 47 of the upper suspension ribbon 46. Wire 36 is coiled so that the upper part of the suspension can be rotated without breaking the wire 36. A similar uncoiled fine wire 40 is connected, at one end, to the lower end of lower suspension ribbon 42 and connects, at its other end, to the lower conductor 39 (FIG. 4).

Lower suspension ribbon 42 passes, at its lower end 421, around the lower bobbin 41 of insulation such as glass and, at its upper end 442, through the opening in lower intermediate bobbin 43, likewise of insulation. The upper end of ribbon 42 is secured to an intermediate portion thereof by a wrapping 423. Upper suspension ribbon 46 passes at its upper end 47, around the outside of upper bobbin 35 (FIG. 4) of insulation, such as ivory or glass, the end of ribbon 46 being joined to an intermediate portion thereof by wrapping 471. The lower end 48 of ribbon 46 passes through a hole in upper intermediate bobbin 45 and is secured to an intermediate portion of the ribbon 46 by wrapping 461. A coil 44 composed of a number of turns of fine wire passes over the outer surfaces of intermediate bobbins 43 and 45. The ends of this coil are connected to the lower suspension ribbon 42 and to the upper suspension ribbon 46. A pig tail 441 from the upper end of coil 44 is cemented to the back of mirror 49 and connects, at its upper end 422, to wrapping 461. A pig tail 443 from the lower end of coil 44 is connected to wrapping 423. If the coil is to operate at forty-two c.p.s., it is made of enameled copper wire. If the coil 44 is to operate at three hundred and thirty c.p.s., it is made of enameled aluminum. A mirror 49 is mounted on the suspension as by being cemented to portions of the upper suspension ribbon 46. Laying the mirror on the suspension insures good automatic mirror alignment in the top to bottom plane. This is important in eliminating the need for vertical adjustment of the galvanometer in the bank. A U-shaped balance bar 50 is cemented to the back of the mirror 49 to provide static balance to rotation.

A damping block 51 consisting of two conical holes 52 and 53 which hold oil, fits over the suspension ribbon 46. Its function is to damp out vibrations in the plane of FIGURE 2, and prevent or reduce effectively any movement of the spot from vibrations that may occur in the plane.

Case 27 contains a galvanometer lens 54 located opposite mirror 49 so that the light from lamp 18 which has passed through lens 19 and through plano cylnidrical, galvanometer lens 54 falls on mirror 49 and is reflected thereby. The focal length is selected to focus in vertical plane at the plane of the paper.

The light reflected from the galvanometer mirrors 49 falls on final mirror 55 which is mounted on the upper portion 2 of case 1 by means of a pair of screws 56. This mirror provides horizontal focus at the paper. Screws 56 can be loosened and the mirror adjusted vertically to obtain the best focus of the light from the galvanometer mirrors.

The recording sheet or film is in the form of a strip-chart of direct-recording paper. By way of example but not of limitation such commercially available paper is that manufactured and sold by Eastman Kodak Company of Rochester, New York, under the trade-mark Kodak Direct and under the trade-mark Linagraph.

Means are provided for housing a supply of this paper in the case 1 and for driving this paper at varying speeds up to twenty-five inches per second under a driving roll 63 and under a paper-hold-down rod 64 in a plane upon which the light from the mirror 55 is focused and out of the case 1 through the opening 5. At the fastest paper speed, writing speeds of 3500 inches per second are obtained. The chart driving means comprises an electric motor 57 which drives a motor fan 58 and which drives a change-speed-gearing, generally indicated 59. A belt 60 connects the output of the change-speed-gearing 59 to a chart-drive roller 63. A supply of chart paper is rolled up around the axis of shaft 62 within a cylindrical housing 61 and passes out of the opening of the housing 61 under the surface of the chart drive roll 63, under the lower surface of the hold-down bar 64, and out of the case 1 through the opening 5. There is a filter 65 in the upper part of opening 5 to prevent the ambient or room light from preexposing the paper on which the records are made.

The oscillograph is connected to an electric power supply 69 of 105–129 volts alternating current at 60 cycles per second supplying 200 watts. Power is supplied to lamp 18 by a transformer 75 rated at 13.0 volts and 5.8 amperes with taps at 12.0 and at 5.5 volts.

FIG. 8 shows the means whereby electricity is supplied to the recording lamp 18 and to the fan motor 10. From the lower terminals of the electric power supply 69 electricity is conducted to the record switch 70 and specifically to stationary switch contact 71 thereof. Record switch 70 is a double pole, single throw switch having movable switch blades 72 and 80 fastened together by a handle or operating means 81. The upper terminal of the electric power supply 69 is connected to the stationary switch contact 82 of record switch 70.

When record switch 70 is closed in the "on" position the circuit may be traced from the lower terminal of supply 69 through contact 71, switch blade 72 and contact 73 to terminal 74 where the circuit branches. One parallel branch passes through motor 10 and the other parallel branch passes through primary windings 76 of transformer 75. These parallel branches unite at terminal 78 which is connected through contact 79, switch blade 80 and contact 82 back to the upper terminal of supply 69.

Transformer 75 has a core 77 of ferrous material so that primary windings 76 energize the secondary windings 83. Section 84 of secondary windings 83 is connected through terminal 87 and lamp 18 to power switch 94 and specifically to stationary switch contact 89 thereof. Power switch 94 is a single pole, double throw switch having a movable switch blade 90 which connects contact 89 to contact 91 which is connected to terminal 92 at the opposite end of section 84 of secondary windings 83. Therefore, when record switch 70 is closed or moved to "on" position, section 84 is energized and energizes recording lamp 18.

When it is desired to operate the oscillograph, power switch 94 is moved from "off" position in which movable switch blade 90 engages contact 91 to "on" position in which movable switch blade 90 engages stationary switch contact 95. Contact 95 is connected to stationary switch contact 97 of lamp intensity switch 96. Lamp intensity switch 96 is a double throw, single blade switch having a movable switch blade 98 adapted to engage stationary switch contacts 99 or 100.

When it is desired to operate lamp 18 at low intensity, switch 96 is moved into the upper or "low" position in which the movable switch blade 98 engages stationary switch contact 100 which is connected to terminal 93 of section 85 of secondary winding 83.

When it is desired to operate lamp 18 at full intensity, switch 96 is moved so that movable switch blade 98 engages stationary switch contact 99 which is connected to terminal 88 at one end of section 86 of secondary winding 83.

Motor 10, which drives fan 11, is adapted to operate at 117 volts alternating current at 2400 revolutions per minute. Motor 57 is adapted to rotate at 2800 revolutions per minute and provide an output speed of 25 inches per second. Clips 17 are to provide good electrical contact between them and the tabs 181 and lamp 18 and to simplify lamp replacement.

The collector lens 19 is of the reducing type. The reducing radius must be centralized in the aperture in the lamp cover 14. This is done by loosening the two screws 191 in the clip 20 and moving the lens 19 up or down so that the band of light covers the galvanometer mirrors 49 both vertically and horizontally.

The magnet bank may be adjusted by loosening two screws 22 and two lockwashers 23 which hold the magnet bank frame 21 to the base plate 8. Also the nuts 251 which clamp the magnet 25 in the frame 21 must be loosened. A translucent screen is held one and one quarter inches in front of the opening 5 in the lower portion 3 of case 1. The position of the magnet assembly is adjusted backward or forward so that the best focus of the vertical bars of light from the galvanometer mirrors 49 is obtained on the translucent screen. If it is necessary to adjust the collector lens 19 backward or forward, the two screws 24 which hold the lamp cover 14 to the cross frame 13 are loosened and the lens 19 is adjusted forward or backward to obtain the best focus. When this is obtained, the lamp housing 14 is locked to the cross frame 13 and the magnet frame 21 is locked to the base plate 8. The case 1 is closed and the magnet 25 is rotated in the frame 21 about a horizontal axis until the brightest spots from the galvanometer mirrors 49 are obtained on the paper P at the writing plane. The nuts 251 are then locked clamping the magnet 25 in the frame 21.

The final mirror 55 is adjusted by loosening the two screws 56 that attached the mirror 55 to the upper portion 2 of the case 1. The mirror 55 is then adjusted vertically to obtain the best focus of the galvanometer mirrors 49 at the writing plane. The mirror 55 is then locked in its adjusted position.

With the above adjustment properly made, lamp 18 is then turned either to high intensity or to low intensity, depending upon the speed at which the paper P is to be driven. The coils 44 of the galvanometers 26 are connected to the phenomena to be measured and an immediately visible trace is obtained on the paper P.

The operation and advantages of the apparatus of the present invention will be apparent from the foregoing description. This invention provides accurate, conveniently operated and efficient means for studying oscillations representative of various phenomena and for making a permanent and immediately visible record through the agency of beams of invisible radiations which act as the "pen" to produce the trace on the sensitized paper. This makes the apparatus instantly and accurately responsive to various types of oscillations including those of higher frequency, since it is unnecessary to overcome the inertia of any physical parts during the formation of a record. By using sensitizing emulsions which are responsive only to the invisible radiations which are used to observe and record the oscillations of the circuit or circuits under investigation it is possible to make a continuous, permanent record for future study while permitting the observer to view the record progressively as it is being produced.

FIGS. 9 and 10 are charts showing graphs of the action of the ultra-violet and closely adjacent radiations and of the sensitizing emulsion of the associated recording paper. These graphs or curves illustrate the range of wave lengths over which the recording effect is obtained with the oscillograph herein described and including an incandescent lamp of the tungsten filament type and recording paper such as that sold commercially by Eastman Kodak Company under the tradename Linagraph direct print paper.

The curves shown in FIGS. 9 and 10 are similar to the curves shown in FIG. 18 of U.S. Patent 2,580,247 to C. A. Heiland. The absicca or horizontal co-ordinates of FIGS. 9 and 10 are wave lengths measured in Angstrom units. The ordinates or vertical co-ordinates are relative values showing comparative recording effect at each of the wave lengths over which the direct recording action takes place. These relative values will be explained hereinafter in greater detail.

Curve B shows the relative energy per unit area per unit wavelength or percentage of maximum energy per unit area per unit wavelength which is received by the paper. The significance of curve B is that it states relative energy per unit area per unit wavelength reaching the recording paper as a function of its wave length or color. The peak value of this radiant energy occurs at some wave length near 9,000 Angstrom units (not shown in FIG. 9). This is arbitrarily called 1.0 or 100%. At 5,500 Angstrom units the relative energy is one-half or 0.5 or 50%. While the tungsten filament lamp produces peak energy at wavelengths to which the recording paper is not sensitive, such energy takes no part in the recording action. What is significant is that there is sufficient energy at the wavelengths (approximately in the range between 3000–4700 Angstrom units, as shown by curve A) at which the recording paper is sensitively responsive to produce a trace.

Curve A of FIG. 9 shows the relative response or percentage of maximum response of the paper to various wavelengths of light. The response to the paper at a given wavelength is the reciprocal of the energy per unit area required to produce a given recording effect. Curve A shows the percentage of maximum paper response. This maximum paper response extends over a range from approximately 3000 to 4700 Angstrom units.

The ordinate designations for curve C in FIG. 10 are the product of the two curves shown in FIG. 9. The ordinates are relative values of the response of the paper and the recording energy of the lamp impinging on the paper.

FIG. 10 thus shows the effect of various wavelengths used to produce the recording effect resulting from the cooperation of the tungsten filament lamp and the recording paper. The maximum recording effect is shown to be obtained closely adjacent to 3700 Angstrom units.

What is claimed is:

1. In apparatus for directly recording the time-variations of phenomena, a pair of energizing terminals adapted for connection to a commercially available supply of alternating current electricity, an incandescent electric lamp having a tungsten filament and quartz envelope, a step-down transformer having a primary winding and secondary windings, connections from said energizing terminals to said primary windings, connections from said secondary winding for energizing the tungsten filament of said lamp, a recording medium having a maximum response to ultra-violet radiant energy of the frequencies emitted by said tungsten filament and transmitted by said quartz envelope and producing an immediately visible trace upon the incidence of such radiation thereon, a galvanometer having a coil responsive to said time-variations, a galvanometer mirror movable with said coil to reflect said radiations, and a second mirror having a surface in the shape of a portion of an ellipse accepting the radiant energy from said galvanometer mirror and impinging substantially all the energy incident on the elliptical mirror surface in a spot of high radiant energy density on said recording medium to produce an immediately visible trace.

2. In apparatus for directly recording the time-variations of phenomena, a pair of energizing terminals adapted for connection to a commercially available alternating current electricity supply, an incandescent electric lamp having a tungsten filament and a quartz envelope, a step-down transformer having a primary winding and a secondary winding, connections from said energizing terminals to said primary winding, connections from said secondary winding for energizing the tungsten filament of said lamp, a galvanometer having a coil responsive to said time variations, a galvanometer mirror movable with said coil to reflect said radiations, and optical means including said galvanometer mirror for reflecting and concentrating the radiant energy emitted by said lamp into a spot on said recording medium of high radiant energy density to produce an immediately visible trace.

3. In apparatus for directly recording the time-variations of phenomena, a source of radiant energy which transmits at least a portion of its energy at ultra-violet wave lengths, a recording medium having a maximum response to such ultra-violet wave lengths and producing an immediately visible trace upon the incidence of such radiations, a galvanometer having a coil responsive to said time-variations thereon, a mirror movable with said coil to reflect said radiations and cause them to move as a pointer upon the movements of said coil, and a second mirror located close to said recording medium and having a surface in the shape of a portion of an ellipse to reflect said radiations from said galvanometer mirror and to impinge said radiations directly upon said recording medium to produce an immediately visible trace.

4. In apparatus for directly recording the time-variations of phenomena, a source of radiant energy which transmits at least a portion of its energy at ultra-violet wave lengths, a recording medium having a maximum response to such ultra-violet wave lengths and producing an immediately visible trace upon the incidence of such radiations thereon, a galvanometer mirror movable to reflect said radiations, and a second mirror having a surface in the shape of a portion of an ellipse accepting the radiant energy from said galvanometer mirror and impinging substantially all the energy incident on the elliptical surface of said mirror in a spot of high radiant energy density on said recording medium to produce an immediately visible trace, said recording medium passing through the focus of the elliptical portion of the surface of said mirror.

5. In an oscillograph for recording the variations with time of phenomena, a source of radiant energy emitting ultra-violet wave lengths, a film most sensitive to ultra-violet radiant energy, a plurality of galvanometers each responsive to the variation with time of one of said phenomena and connected in a separate one of a plurality of electric circuits, a plurality of galvanometer mirrors each mounted on one of said galvanometers to move therewith and arranged in side-by-side relation, and a recording mirror having a surface in the shape of a portion of an ellipse for reflecting directly onto said film the radiant energy reflected from each of said galvanometer mirrors, whereby said radiant energy acts as invisible pointers for producing immediately visible records on said film, said film passing through the focus of the elliptical surface of said recording mirror.

6. In an oscillograph for recording the variations with time of phenomena, a source of radiant energy having an output in the ultra-violet range, a film most sensitive to ultra-violet radiant energy, a plurality of galvanometers each having an aluminum case made by investment casting and each galvanometer responsive to the variations with time of one of said phenomena and connected in a separate one of a plurality of electric circuits, a plurality of galvanometer mirrors each mounted on one of said galvanometers to move therewith and arranged in side-by-side relation, and a recording mirror having a surface in the shape of portion of an ellipse for reflecting directly onto said film the radiant energy reflected from each said galvanometer-mirrors, whereby said radiant energy acts as invisible pointers for producing immediately visible records on said film.

7. In an oscillograph for recording the variations with time of phenomena; a source of radiant energy having an output in the ultra-violet range, a film most sensitive to ultra-violet radiant energy, a plurality of galvanometers each having a pole piece of sintered iron and each responsive to the variations with time of one of said phenomena and connected into a separate one of a plurality of electric circuits, a plurality of galvanometer mirrors each mounted on one of said galvanometers to move therewith and arranged in side-by-side relation, and a recording-mirror having a surface in the shape of a portion of an ellipse for reflecting onto said film the radiant energy reflected from each of said galvanometer-mirrors, whereby said radiant energy reflected from each of said galvanometer-mirrors acts as visible pointers for producing immediately visible records on said film.

References Cited in the file of this patent

UNITED STATES PATENTS

| | | |
|---|---|---|
| 1,897,219 | Schroter | Feb. 14, 1933 |
| 2,300,497 | Glasser | Nov. 3, 1942 |
| 2,430,317 | Wilson et al. | Nov. 4, 1947 |
| 2,580,427 | Heiland | Jan. 1, 1952 |
| 2,883,571 | Fridrich et al. | Apr. 21, 1959 |